(12) United States Patent
Kuttenberger

(10) Patent No.: US 10,752,241 B2
(45) Date of Patent: Aug. 25, 2020

(54) METHOD AND DEVICE FOR INFLUENCING A STEERING ELEMENT OF A SINGLE-TRACK MOTOR VEHICLE INDEPENDENTLY OF THE RIDER

(71) Applicant: Robert Bosch GmbH, Stuttgart (DE)

(72) Inventor: Alfred Kuttenberger, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 15/768,897

(22) PCT Filed: Sep. 21, 2016

(86) PCT No.: PCT/EP2016/072355
§ 371 (c)(1),
(2) Date: Apr. 17, 2018

(87) PCT Pub. No.: WO2017/071882
PCT Pub. Date: May 4, 2017

(65) Prior Publication Data
US 2019/0077396 A1    Mar. 14, 2019

(30) Foreign Application Priority Data

Oct. 27, 2015   (DE) .................. 10 2015 220 901

(51) Int. Cl.
*B60W 30/09*  (2012.01)
*B62K 21/00*  (2006.01)
(Continued)

(52) U.S. Cl.
CPC ............... *B60W 30/09* (2013.01); *B60T 7/12* (2013.01); *B60T 7/22* (2013.01); *B60T 8/1706* (2013.01);
(Continued)

(58) Field of Classification Search
CPC .... B60W 30/09; B60W 10/184; B60W 10/18; B60W 10/20; B60W 2300/36;
(Continued)

(56) References Cited

U.S. PATENT DOCUMENTS

2013/0066522 A1    3/2013   Haas et al.
2014/0288785 A1    9/2014   Bretzigheimer et al.
2019/0077396 A1*   3/2019   Kuttenberger ........ B60T 13/662

FOREIGN PATENT DOCUMENTS

CN    102803058 A    11/2012
CN    103895785 A    7/2014
(Continued)

OTHER PUBLICATIONS

International Search Report dated Jan. 20, 2017 of the corresponding International Application PCT/EP2016/072355 filed Sep. 21, 2016.

*Primary Examiner* — Maceeh Anwari
(74) *Attorney, Agent, or Firm* — Norton Rose Fulbright US LLP; Gerard Messina

(57) ABSTRACT

A method includes ascertaining that an emergency braking operation of a single-track motor vehicle is to be automatically executed driver independently, and based on the ascertainment, automatically and driver-independently influencing a steering element of the motor vehicle during the execution of the emergency braking operation.

6 Claims, 1 Drawing Sheet

(51) Int. Cl.
*B62J 27/00* (2020.01)
*B60T 13/66* (2006.01)
*B60T 7/12* (2006.01)
*B60W 10/184* (2012.01)
*B60T 7/22* (2006.01)
*B60T 8/17* (2006.01)
*B60W 10/18* (2012.01)
*B60W 10/20* (2006.01)

(52) U.S. Cl.
CPC .......... *B60T 13/662* (2013.01); *B60W 10/18* (2013.01); *B60W 10/184* (2013.01); *B60W 10/20* (2013.01); *B62J 27/00* (2013.01); *B62K 21/00* (2013.01); *B60T 2201/022* (2013.01); *B60T 2201/03* (2013.01); *B60T 2260/00* (2013.01); *B60T 2260/02* (2013.01); *B60W 2300/36* (2013.01); *B60Y 2200/13* (2013.01)

(58) Field of Classification Search
CPC .......... B62J 27/00; B60T 13/662; B60T 7/12; B60T 7/22; B60T 8/1706; B60T 2260/00; B60T 2201/022; B60T 2260/02; B60T 2201/03; B62K 21/00; B60Y 2200/13

USPC .......................................................... 701/48
See application file for complete search history.

(56) References Cited

FOREIGN PATENT DOCUMENTS

| | | |
|---|---|---|
| DE | 102005041281 A1 | 3/2006 |
| DE | 102012217137 A1 | 5/2014 |
| DE | 102012221615 A1 | 5/2014 |
| DE | 102013200044 A1 | 7/2014 |
| EP | 2322410 A1 | 5/2011 |
| GB | 2494496 * | 3/2013 |
| GB | 2494496 A | 3/2013 |
| JP | 2002225741 A | 8/2002 |
| JP | 2007531654 A | 11/2007 |
| JP | 2009126432 A | 6/2009 |
| JP | 2010012903 A | 1/2010 |
| JP | 2011507744 A | 3/2011 |
| JP | 2014094745 A | 5/2014 |
| JP | 2015511551 A | 4/2015 |
| JP | 2015514039 A | 5/2015 |
| JP | 2016185746 A | 10/2016 |

* cited by examiner

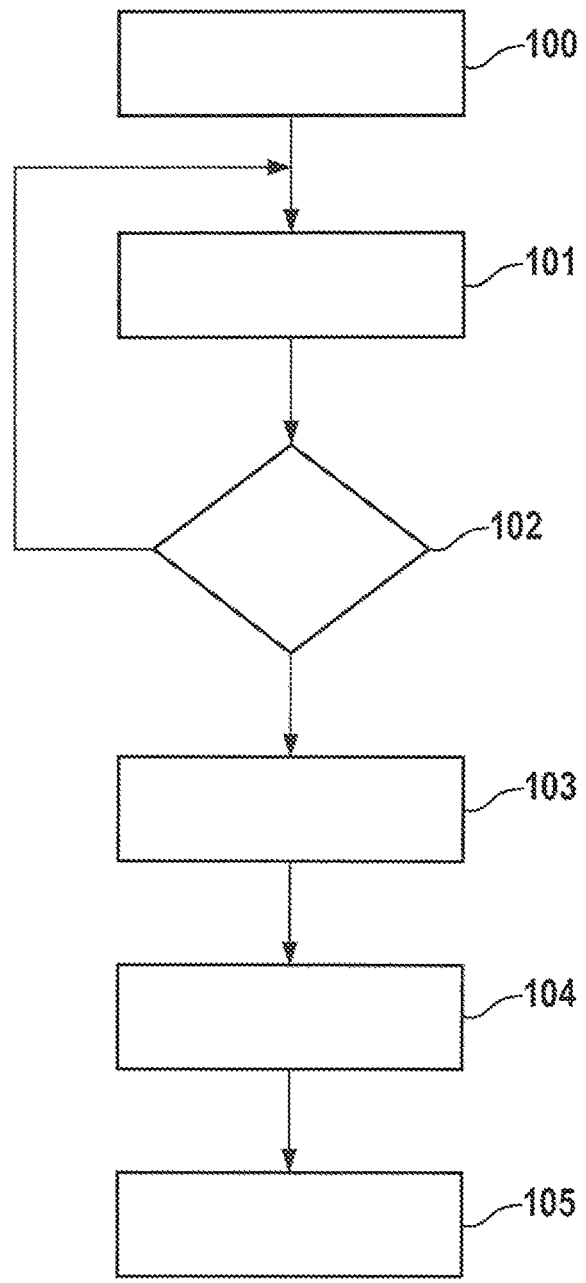

METHOD AND DEVICE FOR INFLUENCING A STEERING ELEMENT OF A SINGLE-TRACK MOTOR VEHICLE INDEPENDENTLY OF THE RIDER

CROSS-REFERENCE TO RELATED APPLICATIONS

The present application is the national stage of International Pat. App. No. PCT/EP2016/072355 filed Sep. 21, 2016, and claims priority under 35 U.S.C. § 119 to DE 10 2015 220 901.6, filed in the Federal Republic of Germany on Oct. 27, 2015, the content of each of which are incorporated herein by reference in their entireties.

FIELD OF THE INVENTION

The present invention relates to influencing a steering element of a single-track motor vehicle independently of a rider during an emergency braking operation.

BACKGROUND

DE 10 2013 200 044 A1 describes a method for automatically carrying out an emergency braking operation in a two-wheeler when a hazardous situation is detected and, in addition, at least one vehicle state variable, a rider characteristic, and/or a surroundings characteristic is in a defined value range.

SUMMARY

According to an example embodiment of the present invention, a method for influencing a steering element of a single-track motor vehicle independently of the rider during an emergency braking operation includes ascertaining the occurrence or the imminence of an emergency braking operation of the single-track motor vehicle carried out independently of the rider; and, depending thereon, influencing the steering element independently of the driver.

In an example embodiment, the steering element is a steering damper which is affected during the emergency braking operation in such a way that the steering damper has a stronger attenuation of handlebar wobbles, i.e., the attenuation of handlebar wobbles is intensified during the emergency braking operation. An adaptive attenuation of handlebar wobbles can also take place during an emergency braking operation, however.

In an example embodiment, the steering element is a steering actuator for the rider-independent adjustment of a steering angle, which is controlled rider-independently during an emergency braking operation in such a way that the single-track motor vehicle continues to travel in a straight line.

In an example embodiment, the single-track motor vehicle is a motorcycle or a motor scooter.

In an example embodiment, the rider-independent emergency braking operation is triggered depending on the signals of a surroundings sensor system looking forward in the direction of travel. Such surroundings sensor systems are known, in particular, in the two-track motor vehicle sector.

According to an example embodiment, a device is designed for carrying out the described method. For example, in an example embodiment, the device is a control unit, in particular, in which program code for carrying out the method according to the present invention is stored.

BRIEF DESCRIPTION OF THE DRAWINGS

The FIGURE is a flowchart that illustrates a method according to an example embodiment of the present invention.

DETAILED DESCRIPTION

The utilization of an active steering damper or active steering for increasing the motorcycle safety is represented in the present invention. If an emergency brake application is initiated by a forward looking sensor system, this is frequently surprising to the rider. The reason is that the riser has not prepared himself or herself for the emergency braking situation. As a result, the motorcycle can start fishtailing due to the strong brake application.

An active steering damper can prove to be advantageous in this case. This actively controllable steering damper can be reconfigured by the surroundings sensor system, even before the emergency braking operation is triggered, in such a way that, as a result, the fishtailing of the motorcycle is prevented or at least considerably reduced in this special emergency braking situation. For example, the damper characteristic can be modified in such a way that the damper becomes firmer. It is also possible to adjust a progressive characteristic of the steering damper, whereby great handlebar deflections are made difficult or are prevented. As a result, the motorcycle remains in the lane and a spill can be prevented. In addition, due to the reinforced straight-forward motion of the motorcycle, more braking power can be transferred again, so that the motorcycle comes to a standstill sooner.

Active steering is also suitable for stabilizing a motorcycle during an emergency braking operation, which can be controlled, for example, via an electric actuator. A hydraulic control, for example, is also conceivable. Unlike an automobile, a motorcycle derives its stability from motion. Gyroscopic forces are built up due to the rotation of the wheels and maintain the balance of the motorcycle. These gyroscopic forces increase as the wheel speed increases. If the motorcycle then slows down, the gyroscopic forces decrease and the motorcycle becomes unstable. Therefore, it becomes increasingly more difficult to maintain the balance of the motorcycle as speed decreases. Since the rider, in an emergency braking situation, is frequently overwhelmed by the situation, the driver often only partially contributes to maintaining the balance of the motorcycle. With the aid of active control and/or regulating impulses on the steering, the steering is controlled in the case of an emergency braking operation in such a way that the motorcycle is held straight until it comes to a standstill. As a result, the motorcycle is prevented from spilling and the motorcycle is optimally decelerated, since the motorcycle can apply the greatest braking power or braking deceleration in the upright state.

Braking while negotiating a curve is one of the most difficult challenges in motorcycling. In this case, due to Kamm's circle, only a portion of the braking force may be transferred to the wheel, since a portion of the force applied by the roadway onto the wheel is required for the curve negotiation of the wheel. During brake application in the curve, the motorcycle also deals with the righting moment, whereby the motorcycle tends to travel straight forward, provided counter-steering is not carried out. Under normal conditions, an experienced motorcyclist handles this situation by preparing for the situation. In an emergency braking situation, however, it is not to be ruled out that the rider who is not prepared for the emergency braking operation does not react or reacts with delay or even tends to react incorrectly. In this case, the active steering engages and stabilizes the motorcycle with the aid of controlled steering motions. Therefore, the motorcycle is safely guided in the curve and, as the speed decreases, is brought into the vertical position in a controlled manner, in order to prevent a spill at a standstill.

The sequence of a method according to an example embodiment of the present invention is represented in the FIGURE. After the start of the method in block 100, the output signals of a surroundings sensor system looking forward in the direction of travel of the motorcycle are evaluated in block 101. In block 102 it is subsequently determined whether, on the basis of these signals, an accident situation of the motorcycle is imminent. If this is not the case, the method returns to block 101. If an accident or a collision is imminent, however, an emergency braking operation is initiated in block 103 and a steering element of the motorcycle is influenced independently of the rider at the same time in block 104, in order to keep the motorcycle under control during the emergency braking operation. The method ends in block 105.

What is claimed is:

1. A method, comprising:
    ascertaining, by a processor, that an automatic and emergency braking operation of a single-track motor vehicle which is to be rider-independently executed; and
    automatically and rider-independently influencing, by the processor, based on the ascertaining, a steering element of the single-track motor vehicle during execution of the emergency braking operation;
    wherein the rider-independent emergency braking operation is triggered depending on signals of a forward looking surroundings sensor system, which looks forward in a direction of travel, and
    wherein the steering element includes an active steering damper, and the influencing causes the active steering damper to have a stronger attenuation of handlebar wobbles, and
    wherein the active steering damper is reconfigurable by the surroundings sensor system, or wherein the steering element includes a steering actuator for a rider-independent adjustment of a steering angle, and the influencing provides that the single-track motor vehicle continues to travel in a straight line.

2. The method of claim 1, wherein the steering element includes the steering actuator for the rider-independent adjustment of the steering angle, and the influencing provides that the single-track motor vehicle continues to travel in the straight line.

3. The method of claim 2, wherein the single-track motor vehicle includes a motorcycle.

4. The method of claim 1, wherein when it is determined whether an accident or a collision is imminent, an emergency braking operation is initiated and a steering element of the single-track motor vehicle is influenced independently of the rider, so as to keep the single-track motor vehicle under control during the emergency braking operation.

5. A system, comprising:
    a processor of a single-track motor vehicle; and
    a steering element of the single-track motor vehicle;
    wherein the processor is configured to perform the following:
        ascertaining that an automatic and emergency braking operation of a single-track motor vehicle which is to be rider-independently executed; and
        automatically and rider-independently influencing, based on the ascertaining, a steering element of the single-track motor vehicle during execution of the emergency braking operation;
    wherein the rider-independent emergency braking operation is triggered depending on signals of a forward looking surroundings sensor system, which looks forward in a direction of travel,
    wherein the steering element includes an active steering damper, and the influencing causes the active steering damper to have a stronger attenuation of handlebar wobbles, and
    wherein the active steering damper is reconfigurable by the surroundings sensor system, or wherein the steering element includes a steering actuator for a rider-independent adjustment of a steering angle, and the influencing provides that the single-track motor vehicle continues to travel in a straight line.

6. The system of claim 5, wherein when it is determined whether an accident or a collision is imminent, an emergency braking operation is initiated and a steering element of the single-track motor vehicle is influenced independently of the rider, so as to keep the single-track motor vehicle under control during the emergency braking operation.

* * * * *